United States Patent
Yeom (10) Patent No.: US 7,230,945 B2
(45) Date of Patent: Jun. 12, 2007

(54) METHOD FOR SENDING DUAL-TONE MULTI-FREQUENCY SIGNAL USING VOICE OVER INTERNET PROTOCOL

(75) Inventor: Eung-Moon Yeom, Uiwang-shi (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1095 days.

(21) Appl. No.: 10/183,398

(22) Filed: Jun. 28, 2002

(65) Prior Publication Data

US 2004/0001482 A1    Jan. 1, 2004

(51) Int. Cl.
*H04L 12/66* (2006.01)
(52) U.S. Cl. ........................ 370/352; 370/401
(58) Field of Classification Search ............. None
See application file for complete search history.

(56) References Cited

U.S. PATENT DOCUMENTS

| | | | |
|---|---|---|---|
| 6,097,804 A | 8/2000 | Gilbert et al. | |
| 6,259,691 B1 | 7/2001 | Naudus | |
| 6,345,047 B1 | 2/2002 | Regnier | |
| 6,404,746 B1 | 6/2002 | Cave et al. | |
| 6,487,196 B1 * | 11/2002 | Verthein et al. | 370/352 |
| 7,039,044 B1 * | 5/2006 | Whitfield et al. | 370/356 |
| 7,068,641 B1 * | 6/2006 | Allan et al. | 370/352 |
| 2001/0030958 A1 | 10/2001 | Kichise | |
| 2005/0111439 A1 * | 5/2005 | Yarlagadda et al. | 370/352 |

OTHER PUBLICATIONS

Bür Goode, "*Voice Over Internet Protocol (VoIP)*," IEEE, vol. 90, No. 9, pp. 1495-1517, Sep. 2002.

\* cited by examiner

*Primary Examiner*—Hassan Kizou
*Assistant Examiner*—Anthony Sol
(74) *Attorney, Agent, or Firm*—Robert E. Bushnell, Esq.

(57) ABSTRACT

A method for sending a dual-tone multi-frequency (DTMF) signal using a voice over Internet protocol (VoIP). A user datagram protocol (UDP) port is set up for transfer of DTMF data between a VoIP gateway and a VoIP client. If a caller inputs a numeral key in a VoIP-based call connection state, the VoIP client requests the VoIP gateway to send information regarding a digital signaling processor (DSP) channel currently established therein. The VoIP gateway retrieves the currently established DSP channel information on the basis of an IP address of the VoIP client and sends the retrieved DSP channel information to the VoIP client. The VoIP client sends DTMF data corresponding to the inputted numeral key to the VoIP gateway through the set-up UDP port. The VoIP gateway receives the DTMF data from the VoIP client through the UDP port, generates a DTMF signal corresponding to the received DTMF data and sends the generated DTMF signal to the VoIP client's counterpart. Therefore, the DTMF signal can be accurately sent to the counterpart, and routing information for transfer of the DTMF data is provided by sending DSP channel information of a current VoIP call to the VoIP client and a Web call server.

22 Claims, 5 Drawing Sheets

FIG.1

| 0–3 | 4–7 | 8–11 | 12 | 13 | 14 | 15 |
|---|---|---|---|---|---|---|
| MESSAGE ID | CLIENT IP | WCS IP | | | | |
| 0 X 31 | IP | IP | DIGIT | CHANNEL | SEQUENCE | ACK |
| 0 X 36 | X | X | | | SEQUENCE NUMBER | |
| 0 X 32 | IP | IP | DIGIT | CHANNEL | SEQUENCE NUMBER | |
| 0 X 37 | X | X | DIGIT | CHANNEL | SEQUENCE NUMBER | ACK |

METHOD FOR SENDING DUAL-TONE MULTI-FREQUENCY SIGNAL USING VOICE OVER INTERNET PROTOCOL

BACKGROUND OF THE INVENTION

1. Technical Field

The present invention relates to a voice over Internet protocol (referred to hereinafter as "VoIP"), and more particularly to a method for sending a dual-tone multi-frequency (i.e., "DTMF") signal in a call connection state based on a VoIP.

2. Related Art

The Internet has recently been recognized as an essential communication medium to many persons. Using the Internet, persons can access a large number of sites providing information, goods and services, and rapidly communicate with those in all places over the whole world by means of electronic mails. With the spread of the Internet, a service has been proposed to provide voice communication between multimedia terminals, such as personal computers (PCs), and voice communication between a multimedia terminal and a conventional voice terminal, such as a telephone, over the Internet. This service is typically called a voice over Internet protocol (IP), or "VoIP", and H.323 (standard for multimedia communication approved by the International Telecommunications Union) and standards associated therewith have been proposed for the VoIP.

The VoIP is adapted to support a multimedia terminal to send voice as well as data through the use of an Internet protocol, and has the advantage of significantly reducing line costs required for telephone or facsimile transmission, thereby enabling telephone users to receive a trunk call service and international call service under Internet and intranet environments by paying only local call fees. Moreover, the VoIP enables the management of voice traffic and data traffic by one equipment and circuit, thereby making it possible to utilize applications such as a Web call center, desktop video, etc.

On the other hand, a variety of attendant services, such as Internet paging, phone banking, electronic commerce, etc., are provided through a call connection, resulting in the necessitation of frequent inputs of numeral keys by a user in a call connection state. If the user inputs a numeral key, a calling telephone generates a dual-tone multi-frequency (i.e., "DTMF") signal corresponding to the inputted numeral key, which is then sent to a called unit (for example, a paging terminal, phone banking center or so forth) over a data network (such as the Internet).

A DTMF signal, which is generated in response to the input of a numeral key by a caller in a call connection state based on the VoIP, is conventionally sent according to a real-time transport protocol (i.e., "RTP") similarly to voice. As known, the RTP was developed to provide a function of transporting real-time data, such as voice, video or dummy data, on multicast or unicast.

However, because the RTP is a standard established on the basis of transfer characteristics of real-time data, it does not handle contents on resource reservation and, particularly, does not provide a flow control function such as timely delivery, QoS (Quality of Signal) assurance, out-of-order transfer prevention or the like. For this reason, it is impossible to sense a loss of data inputted by a caller during transfer thereof. In the regard, conventionally, a number inputted by a caller in a VoIP-based call connection state cannot be accurately transferred to a called party.

This application makes reference to, incorporates the same herein, from my application METHOD FOR SENDING DUAL-TONE MULTI-FREQUENCY SIGNAL USING VOICE OVER INTERNET PROTOCOL filed with the Korean Industrial Property Office on Dec. 9, 2000 and there duly assigned Serial No. 2000-74902.

SUMMARY OF THE INVENTION

Therefore, the present invention has been made in view of the above and other problems, and it is an object of the present invention to provide a method for accurately sending a DTMF signal in a VoIP-based call connection state.

It is another object of the present invention to provide a method for sending DTMF data through a separate UDP (user datagram protocol) port.

It is yet another object of the present invention to provide a method for providing routing information during transfer of a DTMF signal by sending port information of a current VoIP call to a VoIP client and a Web call server.

In accordance with the present invention, the above and other objects can be accomplished by the provision of a method for sending a dual-tone multi-frequency (DTMF) signal using a voice over Internet protocol (VoIP), including the steps of: a) setting up a user datagram protocol (UDP) port for transfer of DTMF data between a VoIP gateway and a VoIP client; b) allowing the VoIP client to request the VoIP gateway to send information regarding a digital signaling processor (DSP) channel currently established therein, if a caller inputs a numeral key in a VoIP-based call connection state; c) allowing the VoIP gateway to retrieve the currently established DSP channel information on the basis of an IP address of the VoIP client and send the retrieved DSP channel information to the VoIP client; d) allowing the VoIP client to send DTMF data corresponding to the inputted numeral key to the VoIP gateway through the setup UDP port; and e) allowing the VoIP gateway to receive the DTMF data from the VoIP client through the UDP port, generate a DTMF signal corresponding to the received DTMF data and send the generated DTMF signal to the VoIP client's counterpart.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference numerals indicate the same or similar components, and wherein.

DETAILED DESCRIPTION OF THE PREFERRED EMBODIMENTS

Now, preferred embodiments of the present invention will be described in detail with reference to the annexed drawings. In the following description, a detailed description of known functions and configurations incorporated herein will be omitted when it may make the subject matter of the present invention rather unclear. Also, the terms used in the following description are terms defined taking into consideration the functions obtained in accordance with the present invention. The definitions of these terms should be determined based on the whole content of this specification because it may be changed in accordance with the option of a user or operator or a usual practice.

Figure 1:
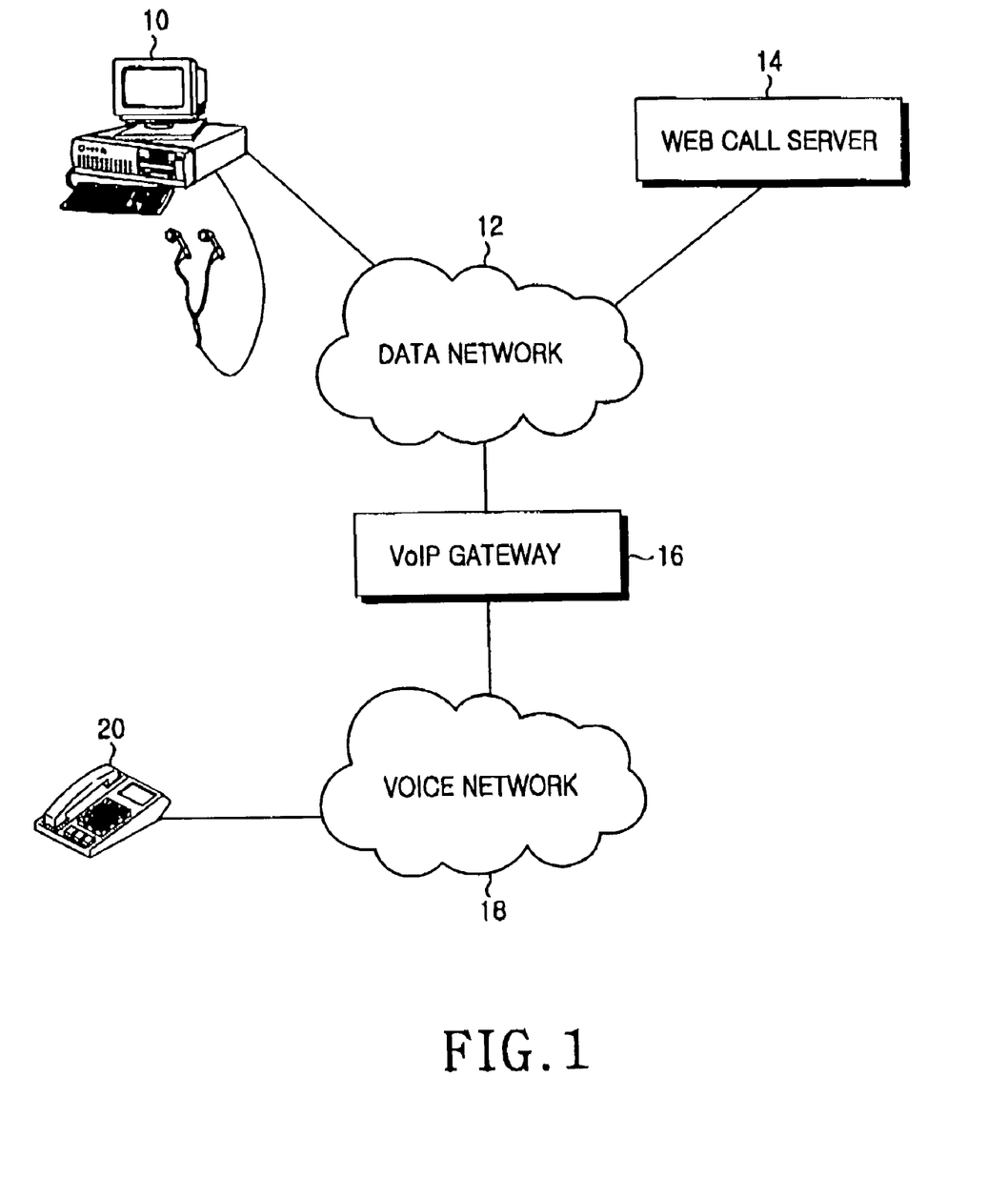
FIG. 1 is a view showing the construction of a VoIP system to which the present invention is applied.

FIG. 1 is a view showing the construction of a VoIP system to which the present invention is applied.

With reference to FIG. 1, a VoIP client 10 is adapted to perform voice communication under the control of a Web call server (i.e., "WCS") 14. The VoIP client 10 may be, for example, a personal computer (i.e., "PC") with a speaker and microphone or a headset, or a telephone terminal capable of providing a data service. The VoIP client 10 communicates with another telephone over a data network 12 under the control of the Web call server 14. For example, the VoIP client 10 may communicate with a counterpart telephone 20 over the data network 12 and a voice network 18.

A VoIP gateway 16 is provided between the data network 12, such as the Internet or an intranet, and the voice network 18, such as a public switching telephone network (i.e., "PSTN"), to process a call connection request from a user and perform data conversion and compression/decompression (compression or decompression or both compression and decompression) between the different networks. The VoIP gateway 16 may be composed of, for example, a known Internet telephony module (i.e., "ITM") card.

Each one of the VoIP client 10, Web call server 14 and VoIP gateway 16 that are connected to the data network 12, has a unique IP address identifiable by the data network 12.

A DTMF signal sending method according to the present invention includes setting up a separate user datagram protocol (UDP) port between the VoIP gateway 16 and the VoIP client 10, or the Web call server 14 controlling it, and sending DTMF data through the set-up UDP port by the VoIP client 10. In the present invention, the DTMF data is defined by a binary value, or digits, necessary to the generation of a DTMF signal, and is sent through the use of a UDP-format message.

The VoIP gateway 16 is also adapted to send information about a channel assigned to the VoIP client 10. For example, the VoIP gateway 16 has four digital signaling processor (i.e., "DSP") chips, each of which can process 16 DSP channels. As a result, the VoIP gateway 16 is able to process a total of 64 DSP channels assigned respectively to VoIP clients. In this regard, the VoIP gateway 16 sends a DSP channel number assigned to a current call to the VoIP client 10 and Web call server 14 so that the channel number can be used as routing information for transfer of DTMF data.

Figure 2:
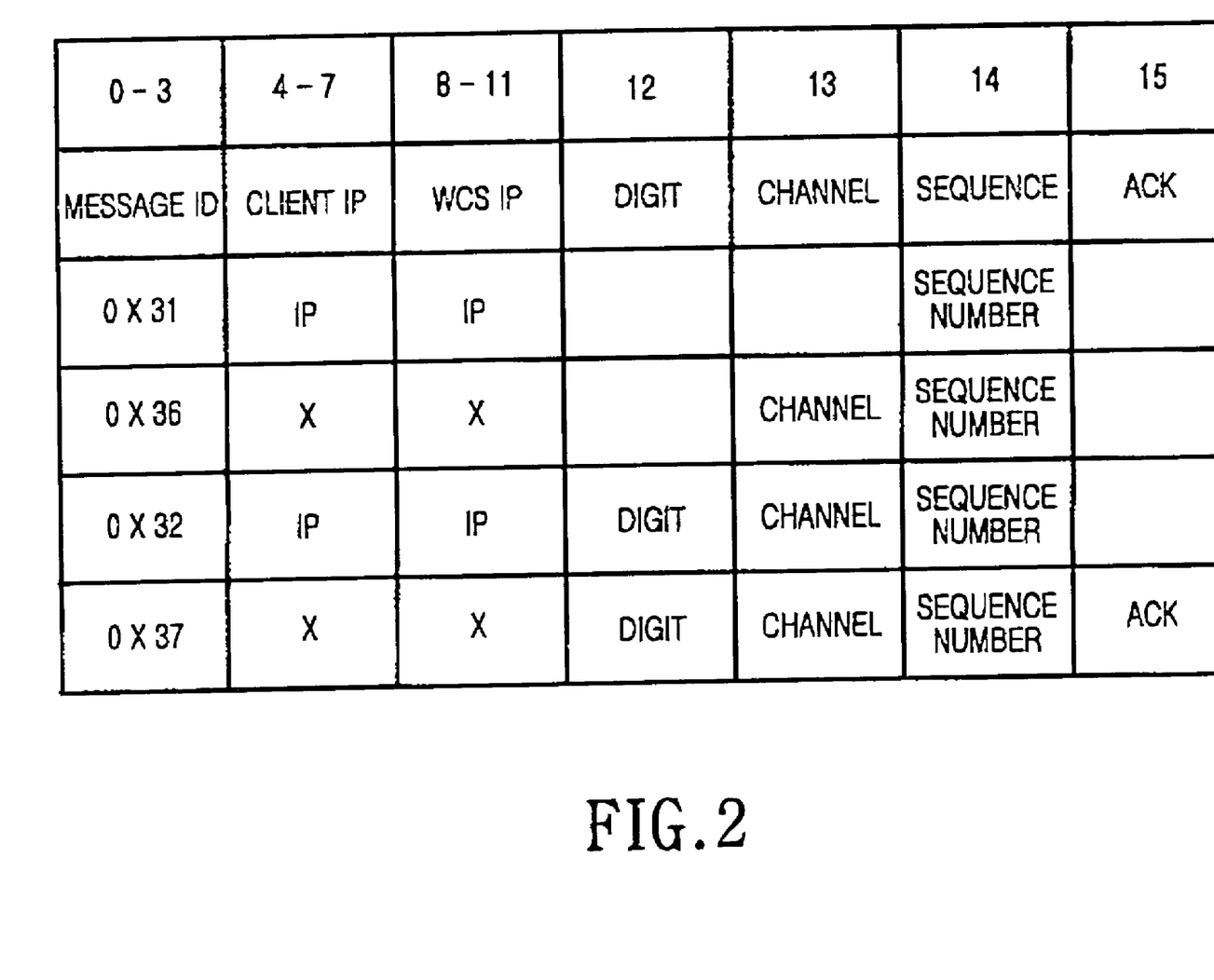
FIG. 2 is a view showing an example of message formats according to the present invention.

FIG. 2 shows formats of messages for transfer of a DTMF signal between the VoIP client 10 and the VoIP gateway 16 according to the present invention.

With reference to FIG. 2, a channel request message CHANNEL_REQ is a message that the Web call server 14 uses to request information regarding a DSP channel currently used between the VoIP client 10 and the VoIP gateway 16. The channel request message is composed of a unique message identifier (ID="0x 31"), a client IP address, a Web call server (i.e., "WCS") IP address, and a sequence number for acknowledgment of a response corresponding to the DSP channel information request. A channel confirm message CHANNEL_CON is a message that the VoIP gateway 16 sends to the Web call server 14 in response to the channel request message. The channel confirm message is composed of a unique message ID (="0x36"), DSP channel information and a sequence number. The sequence number of the channel confirm message is identical to that of a corresponding channel request message.

A DTMF digit send request message DIGIT_SEND_REQ is a message that the Web call server 14 sends to the VoIP gateway 16 in place of the VoIP client 10 in order for the VoIP client 10 to request the VoIP gateway 16 to send a DTMF signal. The DTMF digit send request message is composed of a unique message ID (="0x32"), a client IP address, a Web call server IP address, digits defining DTMF information, DSP channel information and a sequence number. A DTMF digit send confirm message DIGIT_SEND_CON is a message that the VoIP gateway 16 sends to the Web call server 14 in response to the DTMF digit send request message. The DTMF digit send confirm message is composed of a unique message ID (="0x37"), DTMF digits, DSP channel information, a sequence number and acknowledge (i.e., "ACK") information. Similarly, the sequence number of the DTMF digit send confirm message is identical to that of a corresponding DTMF digit send request message.

Figure 3:
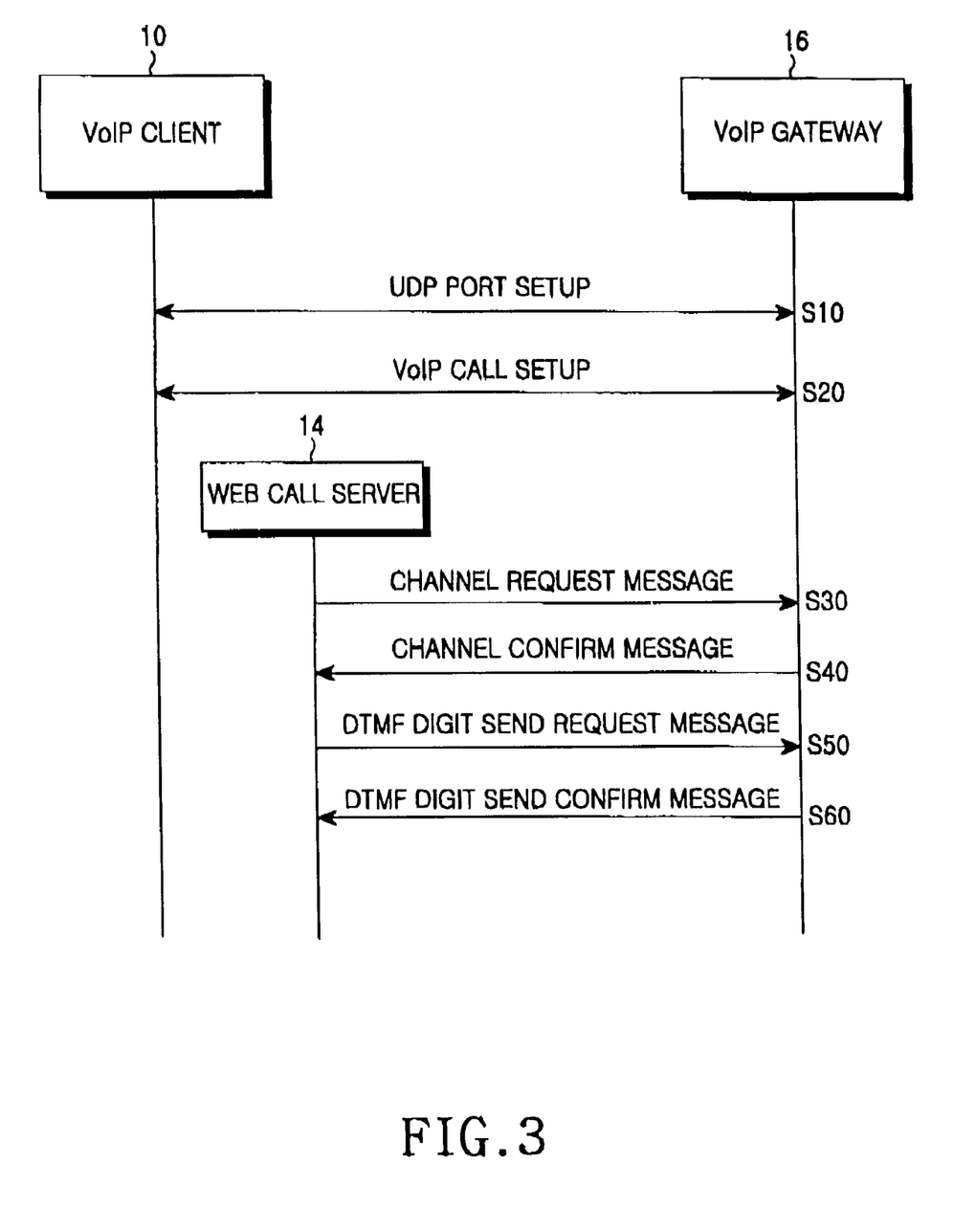
FIG. 3 is a view showing a message flow of a DTMF signal sending operation according to the present invention.

FIG. 3 shows a message flow of a DTMF signal sending operation according to the present invention, which is performed by the Web call server 14 controlling the VoIP client 10, and the VoIP gateway 16.

With reference to FIG. 3, the VoIP client 10 and the VoIP gateway 16 set up a user datagram protocol (i.e., "UDP") port for transfer of DTMF data therebetween at step S10. The UDP is a transport layer protocol which is performed on the Internet protocol (i.e., "IP") similarly to a transmission control protocol (i.e., "TCP") to provide a connectionless datagram service. The UDP is useful in case of sending a small amount of data at one time in a simple manner. A destination IP address and UDP port number are required to use the UDP. The UDP port is a message transfer channel which is assigned and identified with a unique number (e.g., 16 bits), typically any one of 0 to 65536. The VoIP client 10 and VoIP gateway 16 each set up the UDP port by creating one UDP socket and binding a unique IP address thereof with the created UDP socket.

The VoIP client 10 and the VoIP gateway 16 set up a VoIP-based call and initiate voice communication therebetween at step S20. At this time, the VoIP client 10 communicates with a counterpart, for example, a paging terminal, phone banking center or etc. over a channel established on the data network (and voice network).

If a caller inputs a numeral key in the VoIP-based call connection state, then the Web call server 14 controlling the VoIP client 10 creates a channel request message to request information regarding a DSP channel currently used in the VoIP gateway 16, and sends the created channel request message to the VoIP gateway 16 through the set-up UDP port at step S30. As stated previously, the channel request message is composed of a unique message ID, a client IP address, a WCS IP address and a sequence number. The DSP channel is required for transfer of a DTMF signal. The VoIP gateway 16 can retrieve the DSP channel information using an IP address of the VoIP client 10 because it stores and manages the DSP channel information corresponding to the IP address of the VoIP client 10 if a call is set up.

The VoIP gateway 16 sends a channel confirm message containing the retrieval result to the Web call server 14 through the set-up UDP port at step S40. Provided that the VoIP gateway 16 fails to retrieve the DSP channel information, the channel confirm message will contain error information in its channel field instead of the channel information. The Web call server 14 can recognize the retrieval result of the DSP channel from the channel field of the channel confirm message. The channel field has a predetermined value indicative of the DSP channel information or retrieval error. For example, the channel field may have a value "0xff" indicative of the retrieval error, or a value within the range of "0x00" to "0x0f" indicative of the DSP channel number.

Upon receiving the DSP channel information from the VoIP gateway 16, the Web call server 14 sends a DTMF digit send request message containing a numeral inputted by the caller to the VoIP gateway 16 at step S50. The DTMF digit send request message contains DTMF data in the form of digits corresponding to the inputted numeral. The VoIP gateway 16 extracts the DTMF data from the sent DTMF digit send request message and generates a DTMF signal on the basis of the extracted DTMF data. The VoIP gateway 16 then transfers the generated DTMF signal to the VoIP client 10's counterpart over the currently established channel on the voice network. For example, in the case where the caller inputs a numeral key "3", the DTMF data has a binary value 0x03. As a result, the VoIP gateway 16 generates a DTMF signal corresponding to "3" on the basis of the DTMF data.

At step S60, the VoIP gateway 16 sends a DTMF digit send confirm message to the Web call server 14 within a predetermined period of time to inform it of the sent result of the DTMF signal. The Web call server 14 can recognize the sent result of the DTMF signal from an ACK field of the DTMF digit send confirm message. The ACK field has a predetermined value indicative of a DTMF signal sending error or normal state. For example, the ACK field may have a value "0xff" indicative of the sending error, or a value "0x00" indicative of the normal state.

Now, the DTMF signal sending operation according to the present invention will be described in detail under the condition that it is classified into a VoIP gateway operation and a VoIP client operation.

Figure 4:
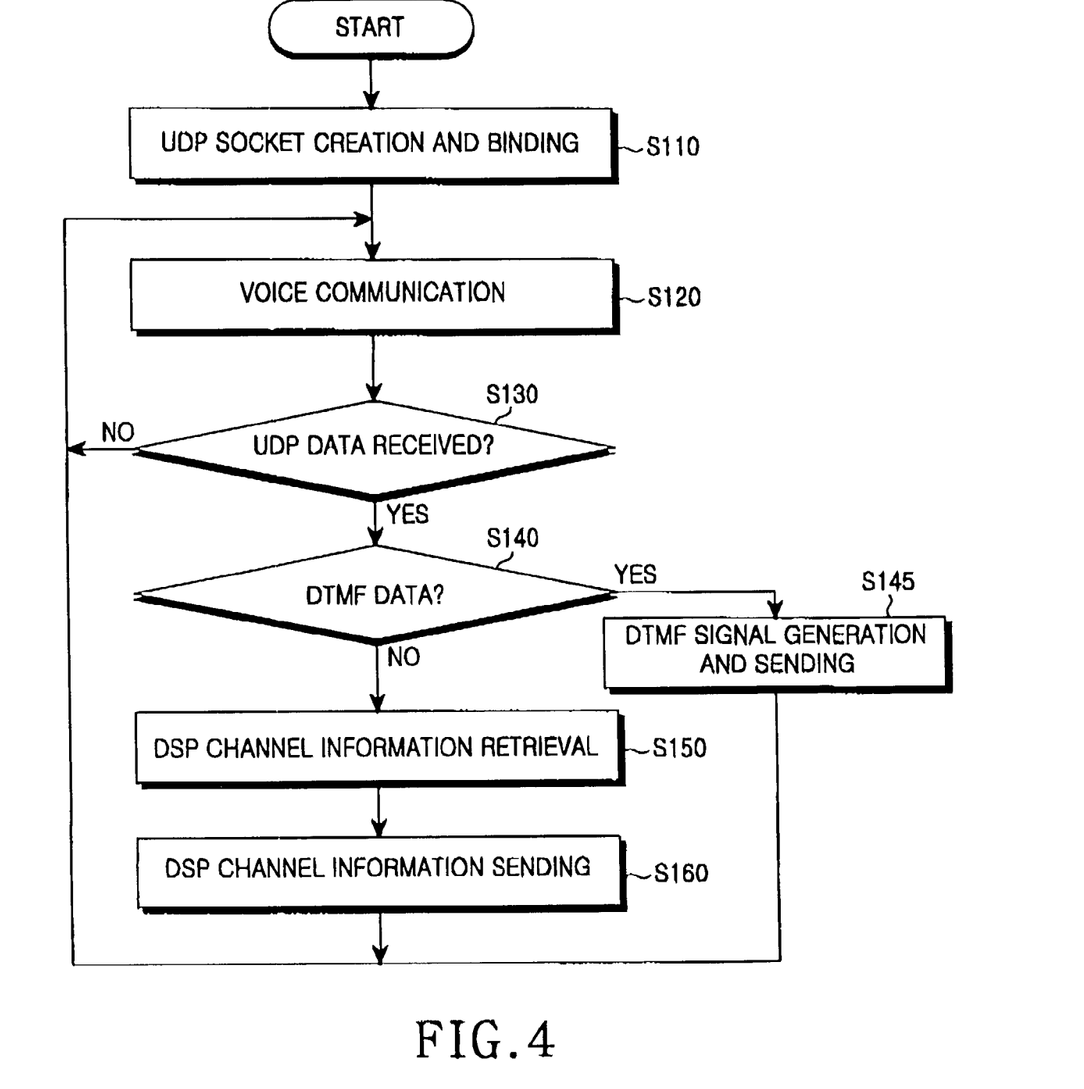
FIG. 4 is a flow chart illustrating a DTMF signal sending operation of a VoIP gateway according to the present invention.

FIG. 4 is a flow chart illustrating a DTMF signal sending operation of the VoIP gateway according to the present invention.

With reference to FIG. 4, the VoIP gateway sets up a UDP port by creating a UDP socket for transfer of DTMF data and binding its IP address with the created UDP socket at step S110. Thereafter, the VoIP gateway initiates VoIP-based voice communication between the VoIP client and its counterpart (for example, a paging terminal, phone banking center or the like) at step S120. Upon receiving a UDP packet through the created UDP socket at step S130, the VoIP gateway checks a message ID in the received UDP packet at step S140 to determine whether the UDP packet is a channel request message requesting DSP channel information or a DTMF digit send request message containing DTMF data.

If the received UDP packet is the channel request message, the VoIP gateway retrieves DSP channel information corresponding to an IP address of the VoIP client at step S150, and generates a channel confirm message containing the retrieved DSP channel information and sends the generated channel confirm message to the VoIP client at step S160. In the case where the received UDP packet is the DTMF digit send request message, the VoIP gateway extracts DTMF digits from the received DTMF digit send request message, generates a DTMF signal on the basis of the extracted DTMF digits and sends the generated DTMF signal to the counterpart over a currently established channel at step S145.

Note that a DTMF on/off timing value is prestored in the VoIP gateway because respective nodes in a network have different DTMF tone durations. As a result, the VoIP gateway generates a DTMF signal on the basis of the prestored DTMF on/off timing value.

Figure 5:
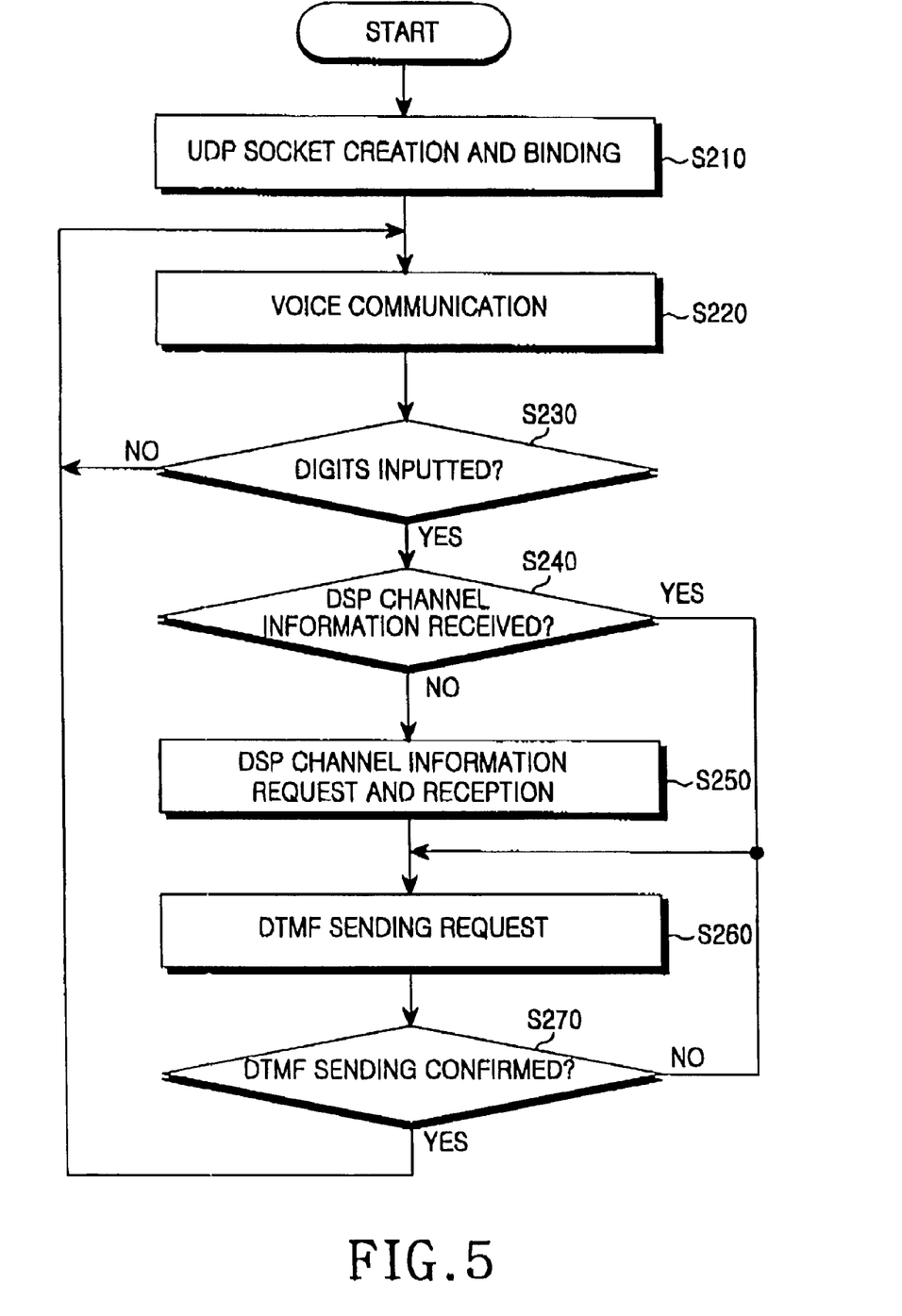
FIG. 5 is a flow chart illustrating a DTMF signal sending operation of a VoIP client according to the present invention.

FIG. 5 is a flow chart illustrating a DTMF signal sending operation of the VoIP client according to the present invention.

With reference to FIG. 5, the VoIP client sets up a UDP port by creating a UDP socket for transfer of DTMF data and binding its IP address with the created UDP socket at step S210. Subsequently, the VoIP client initiates VoIP-based voice communication with its counterpart (for example, a paging terminal, phone banking center or the like) through the VoIP gateway at step S220. If a caller inputs a numeral key at step S230, the VoIP client determines at step S240 whether information regarding a DSP channel currently used in the VoIP gateway has been received.

If the DSP channel information has not been received, the VoIP client sends a channel request message to the VoIP gateway to request the DSP channel information, and then receives a channel confirm message that the VoIP gateway sends in response to the channel request message, at step S250. The VoIP client extracts and stores the DSP channel information from the received channel confirm message. In the case where the DSP channel information has been received at step S240 or it is received at step S250, the VoIP client sends a DTMF digit send request message containing information about a numeral inputted by the caller to the VoIP gateway at step S260. If a DTMF digit send confirm message indicating that a DTMF signal has been normally sent, is received within a predetermined period of time at step S270, the VoIP client performs the voice communication continuously. However, upon receiving a DTMF digit send confirm message indicative of a DTMF sending error, the VoIP client re-sends the DTMF digit send request message to the VoIP gateway.

As apparent from the above description, the present invention provides the following advantages.

In a different manner from a voice signal, a VoIP client sends a DTMF signal inputted in a call connection state, in the form of a message with UDP data. A VoIP gateway generates the DTMF signal in response to the sent UDP data message and transfers it to the VoIP client's counterpart. Therefore, the DTMF signal can be accurately sent to the counterpart. Moreover, routing information for transfer of DTMF data is provided by sending DSP channel information of a current VoIP call to the VoIP client and a Web call server.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for sending a dual-tone multi-frequency signal using a voice over Internet protocol, comprising the steps of:

setting up a user datagram protocol port for transfer of dual-tone multi-frequency data between a voice over Internet protocol gateway and a voice over Internet protocol client;

allowing said voice over Internet protocol client to request said voice over Internet protocol gateway to send information regarding a digital signaling processor channel currently established therein, when a caller inputs a numeral key in a voice over Internet protocol-based call connection state;

allowing said voice over Internet protocol gateway to retrieve the currently established digital signaling processor channel information on the basis of an Internet protocol address of said voice over Internet protocol client and to send the retrieved digital signaling processor channel information to said voice over Internet protocol client;

allowing said voice over Internet protocol client to send dual-tone multi-frequency data corresponding to the inputted numeral key to said voice over Internet protocol gateway through the set-up user datagram protocol port; and allowing said voice over Internet protocol gateway to receive said dual-tone multi-frequency data from said voice over Internet protocol client through said user datagram protocol port, to generate a dual-tone multi-frequency signal corresponding to the received dual-tone multi-frequency data, and to send the generated dual-tone multi-frequency signal to a counterpart of said voice over Internet protocol client.

2. A method for sending a dual-tone multi-frequency signal using a voice over Internet protocol, comprising the steps of:

allowing a voice over Internet protocol gateway to set up a user datagram protocol port for reception of dual-tone multi-frequency data;

allowing said voice over Internet protocol gateway to retrieve information regarding a digital signaling processor channel currently established therein on the basis of an Internet protocol address of said voice over Internet protocol client upon receiving a channel reauest message from said voice over Internet protocol client;

allowing said voice over Internet protocol gateway to send a channel confirm message containing the retrieved digital signaling processor channel information to said voice over Internet protocol client;

allowing said voice over Internet protocol gateway to extract dual-tone multi-frequency data from a received dual-tone multi-frequency digit send request message and to generate a dual-tone multi-frequency signal on the basis of the extracted dual-tone multi-frequency data, when the dual-tone multi-frequency digit send request message from a voice over Internet protocol client is received through the set-up user datagram protocol port in a voice over Internet protocol-based call connection state;

allowing said voice over Internet protocol gateway to send the generated dual-tone multi-frequency signal to said voice over Internet protocol client's counterpart over a channel currently established on a voice network; and allowing said voice over Internet protocol gateway to send a dual-tone multi-freauency digit send confirm message indicative of a sent result of said dual-tone multi-frequency signal to said voice over Internet protocol client through said user datagram protocol oort after sending said dual-tone multi-frequency signal.

3. The method as set forth in claim 2, said dual-tone multi-frequency digit send request message including a message identifier, a voice over Internet protocol client Internet protocol address, an Internet protocol address of a Web call server controlling said voice over Internet protocol client, digits defining said dual-tone multi-frequency data, digital signaling processor channel informationA and a sequence number.

4. The method as set forth in claim 2, said dual-tone multi-frequency digit send confirm message including a message identifier, digits defining said dual-tone multi-frequency data, digital signaling processor channel information, a sequence number, and acknowledge information.

5. The method as set forth in claim 2, said channel request message including a message identifier, said voice over Internet protocol client Internet protocol address, an Internet protocol address of a Web call server controlling said voice over Internet protocol client, and a sequence number.

6. The method as set forth in claim 2, said channel confirm message including a message identifier, said digital signaling processor channel informationA and a sequence number.

7. A method for sending a dual-tone multi-frequency signal using a voice over Internet protocol, comprising the steps of:

allowing a voice over Internet protocol client to set up a user datagram protocol port for transfer of dual-tone multi-frequency data;

allowing said voice over Internet protocol client to send a dual-tone multi-frequency digit send request message containing dual-tone multi-frequency data corresponding to an inputted numeral key to a voice over Internet protocol gateway through the set-up user datagram protocol port, when a caller inputs the numeral key in a voice over Internet protocol-based call connection state; and allowing said voice over Internet protocol client to re-send said dual-tone multi-frequency digit send request message to said voice over Internet protocol gateway when no dual-tone multi-frequency digit send confirm message from said voice over Internet protocol gateway is received through said user datagram protocol port within a predetermined period of time from the sending of said dual-tone multi-frequency digit send request message.

8. The method as set forth in claim 7, further comprising the steps of:

allowing said voice over Internet protocol client to determine whether information regarding a digital signaling processor channel currently established in said voice over Internet protocol gateway has already been received, when the caller inputs said numeral key in the voice over Internet protocol-based call connection state;

allowing said voice over Internet protocol client to send a channel request message to said voice over Internet protocol gateway to request it to send the currently established digital signaling processor channel information, when said digital signaling processor channel information has not been received; and allowing said voice over Internet protocol client to extract and store said digital signaling processor channel information from a received channel confirm message, when the channel confirm message from said voice over Internet protocol gateway is received.

9. The method as set forth in claim 7, said dual-tone multi-frequency digit send request message including a message identifier, a voice over Internet protocol client Internet protocol address, an Internet protocol address of a Web call server controlling said voice over Internet protocol client, digits defining said dual-tone multi-frequency data, digital signaling processor channel information, and a sequence number.

10. The method as set forth in claim 7, said dual-tone multi-frequency digit send confirm message including a message identifier, digits defining said dual-tone multi-frequency data, digital signaling processor channel information, a sequence number, and acknowledge information.

11. The method as set forth in claim 8, said channel request message including a message identifier, a voice over Internet protocol client Internet protocol address, an Internet protocol address of a Web call server controlling said voice over Internet protocol client, and a sequence number.

12. The method as set forth in claim 8, said channel confirm message including a message identifier, said digital signaling processor channel informationA and a sequence number.

13. An apparatus, comprising:
a client accommodating voice over Internet protocol and connected to a data network;
a gateway accommodating voice over Internet protocol provided between the data network and a voice network to process a call request from a user and to perform data conversion and compression and decompression between networks; and
a web call server controlling said client and said gateway, a user datagram protocol port for transfer of dual-tone multi-frequency data between said gateway and said client, said client sending dual-tone multi-frequency data corresponding to an inputted numeral key to said gateway through the set-up user datagram protocol port, when a caller inputs the numeral key in a voice over Internet protocol-based call connection state, said gateway receiving said dual-tone multi-frequency data from said client through said user datagram protocol port, confirming a received result of said dual-tone multi-frequency data to inform said client of the received result, generating a dual-tone multi-frequency signal corresponding to the received dual-tone multi-frequency data, and sending the generated dual-tone multi-frequency signal to a counterpart of said client.

14. The apparatus of claim 13, said gateway generating said dual-tone multi-frequency signal on the basis of information regarding an on/off period of said dual-tone multi-frequency signal, prestored therein.

15. The apparatus of claim 14, said gateway sending said dual-tone multi-frequency signal over a channel currently established on said voice network.

16. The apparatus of claim 15, said client re-sending said dual-tone multi-frequency data to said gateway when the received result of said dual-tone multi-frequency data is not confirmed within a predetermined period of time from the sending of said dual-tone multi-frequency data.

17. A method, comprising the steps of:
setting up a user datagram protocol port by a gateway accommodating voice over Internet protocol;
initiating voice over Internet protocol-based voice communication between a client accommodating voice over Internet protocol and a counterpart of said client;
checking, by said gateway, a message identity in a received user datagram protocol packet to determine whether the user datagram protocol packet is one of a channel request message requesting digital signaling processor channel information and dual-tone multi-frequency data upon receiving said user datagram protocol packet through said user datagram protocol socket; and
retrieving said digital signaling processor channel information corresponding to an Internet protocol address of said client, generating a channel confirm message containing the retrieved digital signaling processor channel information, and sending the generated channel confirm message to said client when the received user datagram protocol packet is the channel request message.

18. The method of claim 17, further comprising the steps of extracting a dual-tone multi-frequency digit send request message, generating a dual-tone multi-frequency signal on the basis of the extracted dual-tone multi-frequency digits, and sending the generated dual-tone multi-frequency signal to the counterpart of said client over a currently established channel when the received user datagram protocol packet is the dual-tone multi-frequency digit send request message.

19. A method, comprising the steps of:
setting up a user datagram protocol port by a client accommodating voice over Internet protocol;
initiating voice over Internet protocol-based voice communication between said client and a counterpart of said client;
determining, by said client, whether information regarding a channel currently used in a gateway, accommodating the voice over Internet protocol, has been received when a caller inputs a numeral key;
sending, by said client, a channel request message to said gateway to request the channel information, and then receiving a channel confirm message that said gateway sends in response to the channel request message when the channel information has not been received;
extracting and storing, by said client, the channel information from the received channel confirm message; and
sending, by said client, a dual-tone multi-frequency digit send request message containing information about a numeral inputted by the caller to said gateway when the channel information has been received.

20. The method of claim 19, wherein, when a dual-tone multi-frequency digit send confirm message indicating that a dual-tone multi-frequency signal has been normally sent is received within a predetermined period of time, said client performs the voice communication continuously.

21. The method of claim 20, wherein upon receiving the dual-tone multi-frequency digit send confirm message, which is a dual-tone multi-frequency sending error, said client re-sends the DTMF digit send request message to said gateway.

22. The method of claim 19, further comprising the steps of:
setting up the user datagram protocol port by said gateway accommodating voice over Internet protocol;
initiating voice over Internet protocol-based voice communication between said client accommodating the voice over Internet protocol and a counterpart of said client;
checking, by said gateway, a message identity in a received user datagram protocol packet to determine whether the user datagram protocol packet is one of a channel request message requesting digital signaling processor channel information and dual-tone multi-frequency data upon receiving said user datagram protocol packet through said user datagram protocol socket; and retrieving said digital signaling processor channel information corresponding to an Internet protocol address of said client, generating a channel confirm message containing the retrieved digital signaling processor channel information, and sending the generated channel confirm message to said client when the received user datagram protocol packet is the channel request message.

* * * * *